United States Patent [19]

Nowak et al.

[11] Patent Number: 5,381,263

[45] Date of Patent: Jan. 10, 1995

[54] FIVE-DEGREE-OF-FREEDOM OCULAR MOUNTING ASSEMBLY

[75] Inventors: David Nowak, Dexter; Richard Kim, Ann Arbor, both of Mich.

[73] Assignee: General Scientific Corporation, Ann Arbor, Mich.

[21] Appl. No.: 93,831

[22] Filed: Jul. 19, 1993

[51] Int. Cl.⁶ .................... G02B 23/18; G02C 9/00
[52] U.S. Cl. .................... 359/411; 359/409; 351/58; 351/158
[58] Field of Search ............. 351/205, 158, 57, 58, 351/59, 63; 359/368, 374, 399, 407, 409, 411, 815, 822

[56] References Cited

U.S. PATENT DOCUMENTS

| | | | |
|---|---|---|---|
| 296,337 | 6/1888 | Caplan | D16/133 |
| 3,029,696 | 4/1962 | Schmidt | 359/411 |
| 4,364,645 | 12/1982 | Feinbloom | 351/158 X |
| 4,449,787 | 5/1984 | Burbo et al. | 359/411 X |
| 4,681,413 | 7/1987 | Schmidt et al. | 351/205 |
| 5,179,735 | 1/1993 | Thomanek | 359/815 X |

Primary Examiner—William L. Sikes
Assistant Examiner—David R. Parsons
Attorney, Agent, or Firm—Krass & Young

[57] ABSTRACT

An ocular mounting assembly for adjustably mounting a pair of ocular devices, such as telemicroscopic loupes, to an eyeglass frame or head mount with linear and rotational adjustments through five degrees of freedom. The ocular mounting assembly includes an adjustable ocular support assembly and an adjustable clamp assembly rotatably attached to the ocular support assembly. The ocular support assembly provides interpupillary distance, convergence angle and view direction adjustment of the ocular devices, which are rotatably attached to the support assembly. The adjustable clamp assembly provides height and view angle adjustment of the ocular devices and allows the ocular devices to be flipped up out of the way when not needed. The height adjustment in conjunction with the view angle adjustment allows the line of sight to be adjusted while the ocular devices are positioned close to the eye or eyeglass lens.

8 Claims, 3 Drawing Sheets

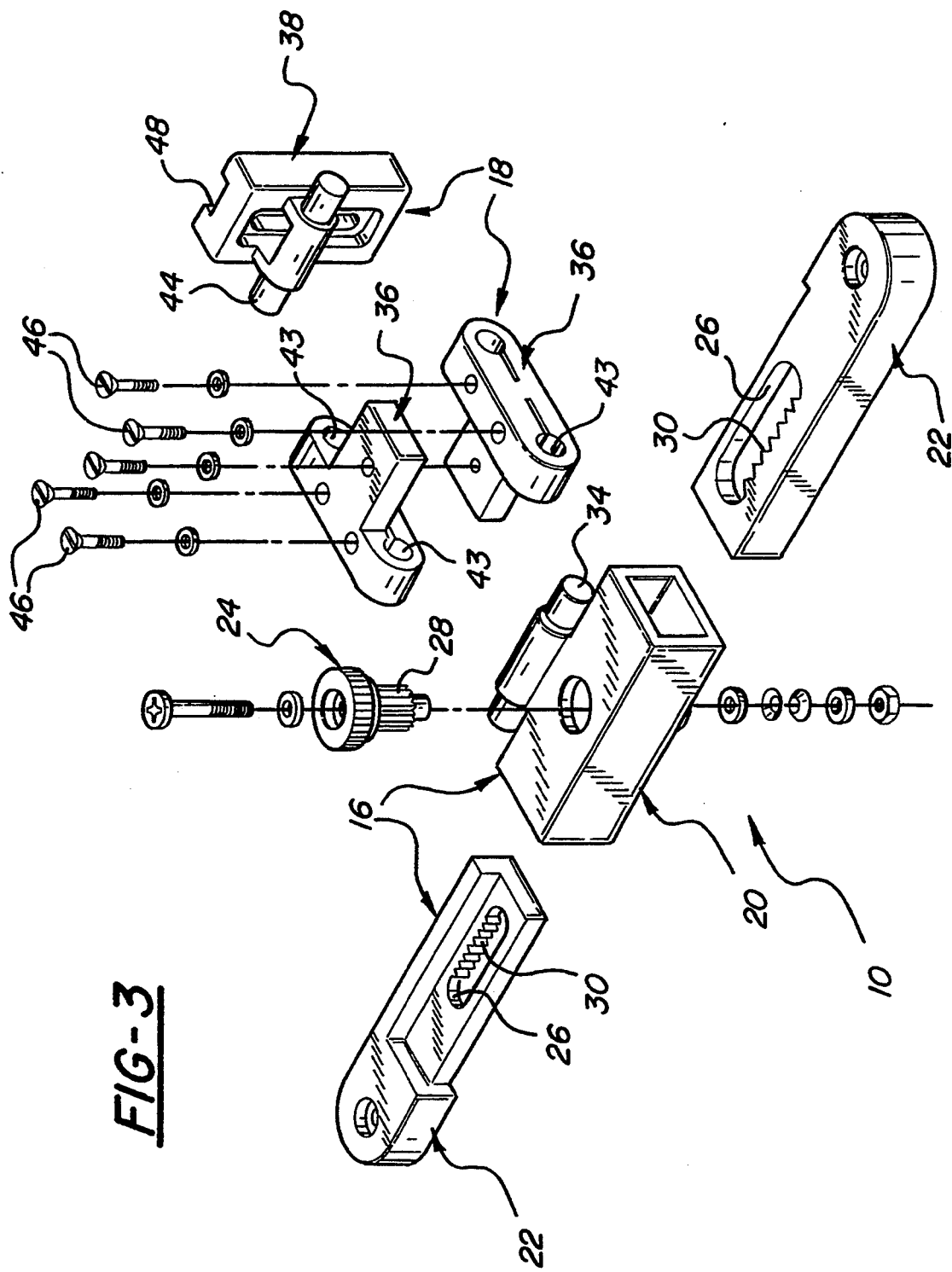

FIVE-DEGREE-OF-FREEDOM OCULAR MOUNTING ASSEMBLY

BACKGROUND OF THE INVENTION

This invention relates generally to telemicroscopic instruments and, more particularly, to ocular mounting assemblies for adjustably mounting a pair of telemicroscopic loupes to an eyeglass frame or head mount.

Telemicroscopic instruments are widely used for magnifying a work area during precision work such as delicate surgery, dental work, inspection of circuit board solder joints, and assembly of miniature parts. A typical telemicroscopic instrument includes a pair of telemicroscopic loupes which are adjustably mounted to an eyeglass frame or head mount. The telemicroscopic loupes combine the long working distance of the telescope with the high quality magnification of the microscope. This type of optical instrument provides the user with a magnified image of the work area with a field of view at about arm's length. However, the mounting assemblies typically used in these telemicroscopic instruments provide adjustments over a rather limited number of degrees of freedom, thus causing unnecessary neck and back strain for the user. Accordingly, there has been a need for an ocular mounting assembly providing adjustments over an increased number of degrees of freedom. The present invention clearly fulfills this need.

SUMMARY OF THE INVENTION

The present invention resides in a novel ocular mounting assembly for adjustably mounting a pair of ocular devices, such as telemicroscopic loupes, to an eyeglass frame or head mount with linear and rotational adjustments through five degrees of freedom. The ocular mounting assembly includes an adjustable ocular support assembly and an adjustable clamp assembly rotatably attached to the ocular support assembly. The ocular support assembly provides interpupillary distance, convergence angle and view direction adjustment of the ocular devices, which are rotatably attached to the support assembly. The adjustable clamp assembly provides height and view angle adjustment of the ocular devices and allows the ocular devices to be flipped up out of the way when not needed. The height adjustment in conjunction with the view angle adjustment allows the line of sight to be adjusted while the ocular devices are positioned close to the eye or eyeglass lens.

In a preferred embodiment of the present invention, the ocular support assembly includes a rectangular-shaped ocular support assembly housing, a pair of ocular support arms and an interpupillary adjustment knob. The ocular support arms are slidably disposed within the assembly housing and the adjustment knob is inserted through an opening in the assembly housing to engage a slot in each ocular support arm. The adjustment knob has a set of serrated teeth which engages a set of serrated teeth in each slot, such that rotation of the knob causes the ocular support arms to slide in and out of the assembly housing for adjustment of the interpupillary distance between the two ocular devices.

The ocular devices are rotatably attached to the ends of the ocular support arms, thus allowing the convergence angle and view direction of the ocular devices to be adjusted. A view angle hinge pin is rigidly attached to the ocular support assembly housing for rotatably attaching the ocular support assembly to the adjustable clamp assembly, thus allowing the view angle of the ocular devices to be adjusted.

The adjustable clamp assembly includes a pair of clamp assembly members, a clamp assembly housing, a height adjustment rail, and an eyeglass frame mounting clamp. The clamp assembly members have slots that engage the view angle hinge pin and a flip-up hinge pin. The flip-up hinge pin is rigidly attached to the clamp assembly housing and rotatably attaches the clamp assembly members to the assembly housing, thus allowing the ocular devices to be flipped up out of the way when not needed.

The clamp assembly housing includes an undercut channel that engages a rectangular-shaped undercut pad on the height adjustment rail, thus allowing the height of the ocular devices to be adjusted. The eyeglass frame mounting clamp and the height adjustment rail clamp together about an eyeglass frame to rigidly attach the clamp assembly to the eyeglass frame. The mounting clamp can also be used to mount the ocular mounting assembly to a head mount.

It will be appreciated from the foregoing that the present invention represents a significant advance in the field of telemicroscopic instruments. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 3 is a perspective view of the ocular mounting assembly showing the various parts of the assembly.

DETAILED DESCRIPTION OF THE PREFERRED EMBODIMENT

Figure 1:
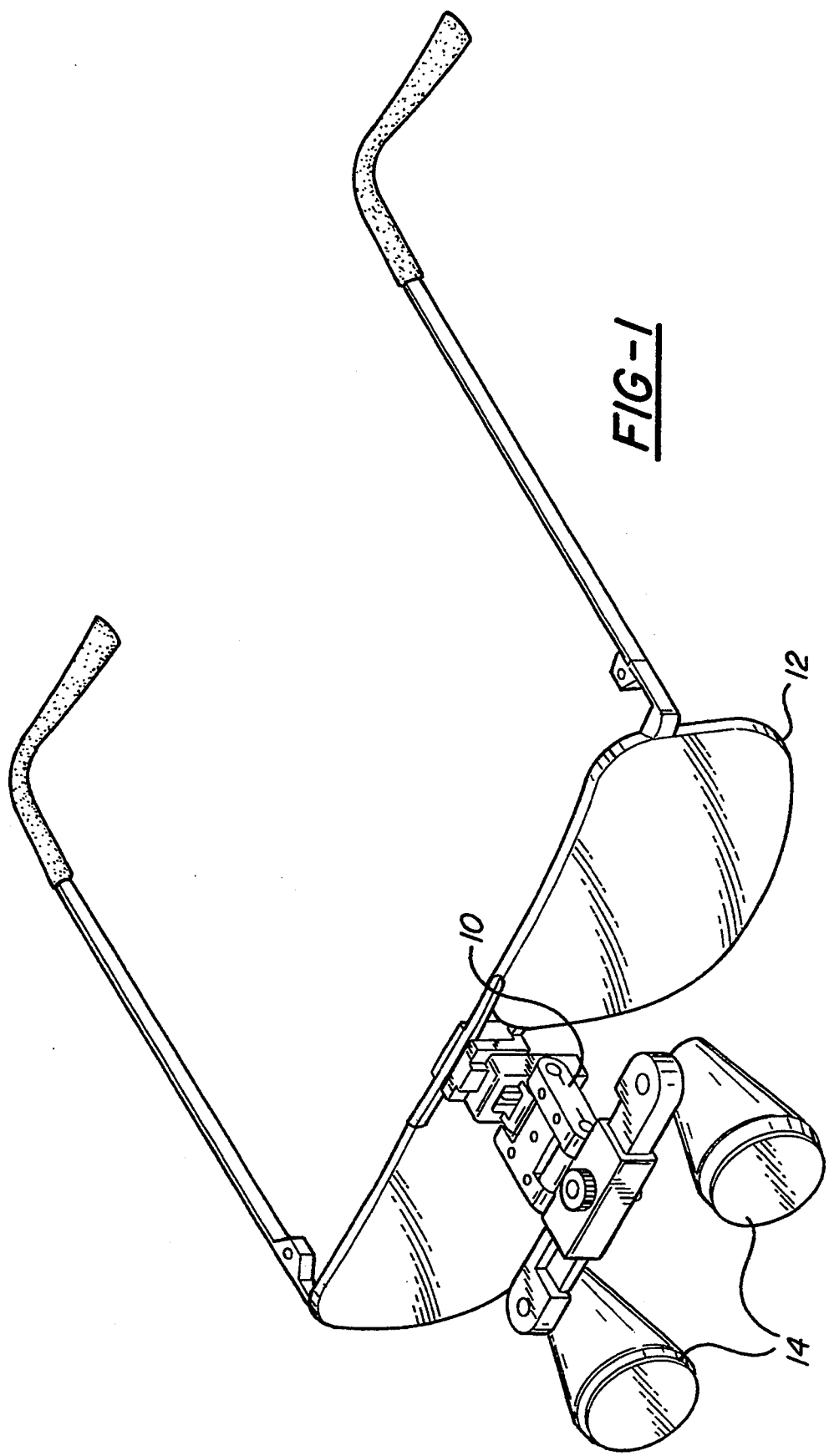
FIG. 1 is a perspective view of a telemicroscopic instrument employing the five-degree-of-freedom ocular mounting assembly of the present invention.

As shown in the drawings for purposes of illustration, the present invention is embodied in a novel ocular mounting assembly for adjustably mounting a pair of ocular devices, such as telemicroscopic loupes, to an eyeglass frame or head mount with linear and rotational adjustments through five degrees of freedom. The ocular mounting assembly includes an adjustable ocular support assembly and an adjustable clamp assembly rotatably attached to the ocular support assembly. The ocular support assembly provides interpupillary distance, convergence angle and view direction adjustment of the ocular devices, which are rotatably attached to the support assembly. The adjustable clamp assembly provides height and view angle adjustment of the ocular devices and allows the ocular devices to be flipped up out of the way when not needed. The height adjustment in conjunction with the view angle adjustment allows the line of sight to be adjusted while the ocular devices are positioned close to the eye or eyeglass lens.

Figure 2:
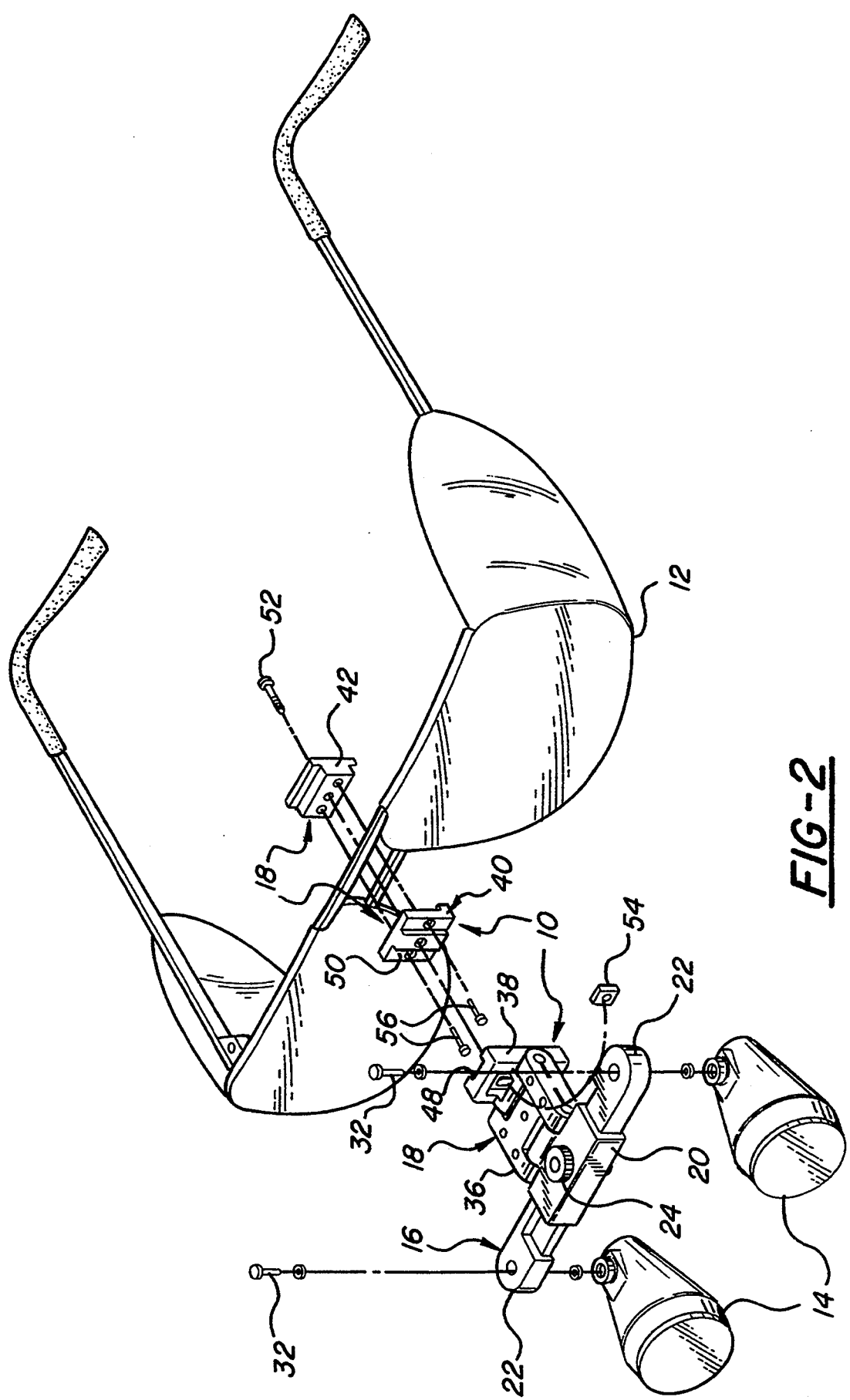
FIG. 2 is a perspective view of the telemicroscopic instrument showing in detail the various parts of the ocular mounting assembly.

As shown in FIGS. 1 and 2, a telemicroscopic instrument employing a five-degree-of-freedom ocular mounting assembly 10 in accordance with the present invention includes an eyeglass frame 12, a pair of ocular devices 14, and the ocular mounting assembly 10 which adjustably mounts the ocular devices 14 to the eyeglass frame 12. As shown in FIGS. 2 and 3, the ocular mounting assembly 10 includes an adjustable ocular support assembly 16 and an adjustable clamp assembly 18 that is rotatably attached to the ocular support assembly 16. The ocular support assembly 16 supports the ocular devices 14 and the adjustable clamp assembly 18 is rigidly attached to the eyeglass frame 12.

As shown in FIG. 3, the ocular support assembly 16 includes a rectangular-shaped ocular support assembly housing 20, a pair of ocular support arms 22 and an interpupillary adjustment knob 24. The ocular support arms 22 are slidably disposed within the assembly housing 20 and the adjustment knob 24 is inserted through an opening in the assembly housing to engage a slot 26 in each ocular support arm 22. The adjustment knob 24 has a set of serrated teeth 28 which engages a set of serrated teeth 30 in each slot 26, such that rotation of the knob 24 causes the ocular support arms 22 to slide in and out of the assembly housing 20 for adjustment of the interpupillary distance between the two ocular devices 14.

As shown in FIG. 2, the ocular devices 14 are rotatably attached to the ends of the ocular support arms 22, thus allowing the convergence angle and view direction of the ocular devices 14 to be adjusted. The ocular devices are attached by screws 32 which allow the rotational friction of the convergence angle and view direction adjustment to be varied and the ocular devices to be locked in place once the desired convergence angle and view direction are selected. As shown in FIG. 3, a view angle hinge pin 34 is rigidly attached to the ocular support assembly housing 20 for rotatably attaching the ocular support assembly 16 to the adjustable clamp assembly 18, thus allowing the view angle of the ocular devices 14 to be adjusted.

As shown in FIGS. 2 and 3, the adjustable clamp assembly 18 includes a pair of clamp assembly members 36, a clamp assembly housing 38, a height adjustment rail 40, and an eyeglass frame mounting clamp 42. The clamp assembly members 36 have slots 43 which engage the view angle hinge pin 34 and a flip-up hinge pin 44. The flip-up hinge pin 44 is rigidly attached to the clamp assembly housing 38 and rotatably attaches the clamp assembly members 36 to the assembly housing 38, thus allowing the ocular devices 14 to be flipped up out of the way when not needed. The clamp assembly members 36 are fastened together with screws 46 which allow the rotational friction of the view angle adjustment and the flip-up hinge to be varied.

The clamp assembly housing 38 includes an undercut channel 48 that engages a rectangular-shaped undercut pad 50 on the height adjustment rail 40, thus allowing the height of the ocular devices 14 to be adjusted. The height adjustment in conjunction with the view angle adjustment allows the line of sight to be adjusted while the ocular devices are positioned close to the eyeglass lens. A screw 52 and nut 54 lock the clamp assembly housing 38 to the height adjustment rail 40 once the desired height of the ocular devices 14 is selected. The eyeglass frame mounting clamp 42 and the height adjustment rail 40 clamp together about the eyeglass frame 12 using screws 56 to rigidly attach the clamp assembly 18 to the eyeglass frame. The mounting clamp can also be used to mount the ocular mounting assembly to a head mount.

From the foregoing, it will be appreciated that the present invention represents a significant advance in the field of telemicroscopic instruments. Although a preferred embodiment of the invention has been shown and described, it will be apparent that other adaptations and modifications can be made without departing from the spirit and scope of the invention. Accordingly, the invention is not to be limited, except as by the following claims.

We claim:

1. A five-degree-of-freedom ocular mounting assembly, comprising:
   a rectangular-shaped ocular support assembly housing having a rigidly attached view angle hinge pin with opposing ends;
   a pair of ocular support arms slidably disposed within the assembly housing for supporting a pair of ocular devices rotatably attached to the ends of the ocular support arms, each ocular support arm having a slot with a set of serrated teeth, the teeth being substantially enclosed within the housing during operation;
   an interpupillary adjustment knob on the assembly housing having a set of serrated teeth which engage with the serrated teeth in the slots of the ocular support arms;
   an eyeglass mount having a protruding pad with parallel sides and a rigidly-attached flip-up hinge pin with opposing ends;
   a pair of clamp assembly members having slots that engage the flip-up hinge pin and the view-angle hinge pin, the assembly providing means for independent adjustment of each end of each pin;
   a height adjustment rail that engages with the pad on the eyeglass mount to allow the height of the ocular devices to be adjusted; and
   means to lock the pad into the channel at a desired height,
   wherein rotation of the interpupillary adjustment knob causes the ocular support arms to slide in and out of the assembly housing for adjustment of the interpupillary distance between the two ocular devices, the convergence angle and view direction of the two ocular devices being adjusted by rotating the ocular devices, the ocular support assembly about the view angle hinge pin and the ocular devices are flipped up out of the way by rotating the ocular support assembly and clamp assembly members about the flip-up hinge pin.

2. The ocular mounting assembly as set forth in claim 1, wherein the ocular devices are rotatably attached to the ends of the ocular support arms by screws which allow the rotational friction of the convergence angle and view direction adjustment to be varied and the ocular devices to be locked in place once the desired convergence angle and view direction are selected.

3. The ocular mounting assembly as set forth in claim 1, and further including a mounting clamp that clamps together with the height adjustment rail about the eyeglass frame to rigidly attach the clamp assembly to the frame.

4. The ocular mounting assembly as set forth in claim 1, the means for independent adjustment of each end of each pin including screws that allow the rotational friction of the view angle adjustment and the flip-up of the ocular devices to be varied.

5. In an ocular mounting assembly of the type having an eyeglass mount, a flip-up and view-angle adjustment assembly connected to the mount, and an ocular support assembly connected to the flip-up and view-angle adjustment assembly, the ocular support assembly including a pair of slidably disposed arms, each arm supporting an ocular to provide for interpupillary distance adjustment, each ocular being rotatable relative to its arm for convergence angle adjustment, the improvement comprising:

the flip-up and view-angle adjustment assembly incorporating flip-up and view-angle hinge pins, each with opposing ends; and a yoke assembly which encases the pins, the yoke assembly including separately adjustable clamping means associated with each end of each pin.

6. The ocular mounting assembly as set forth in claim 5, further including:

a vertically disposed height adjustment mechanism associated with the eyeglass mount, the mechanism proving for line-of-sight adjustment of the oculars.

7. The ocular mounting assembly as set forth in claim 6, the height adjustment mechanism including:

a vertical rail forming a part of the eyeglass mount;

a vertical channel forming a part of the flip-up and view-angle adjustment assembly which engages with the rail; and means to lock the rail within the channel once the desired height of the oculars has been selected.

8. The ocular mounting assembly as set forth in claim 5, the ocular support assembly including a housing, said arms being substantially enclosed within the housing during normal operation.

* * * * *